Jan. 8, 1963
G. BRUCK
3,072,845
NOISE FACTOR MEASUREMENT SYSTEM
Filed May 9, 1960
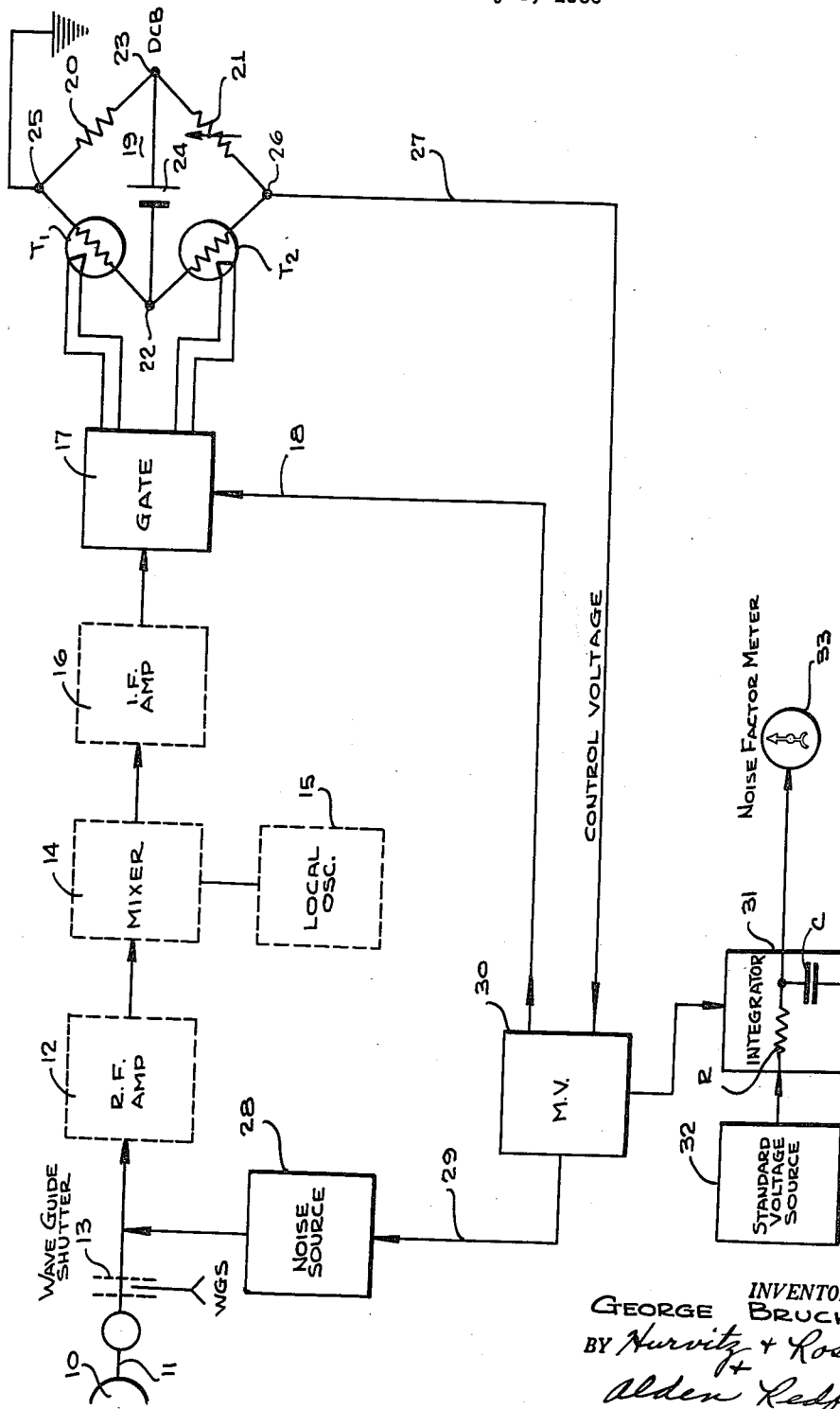
INVENTOR.
GEORGE BRUCK
BY Hurvitz + Rose
+
Alden Redfield
ATTORNEYS United States Patent Office 3,072,845
Patented Jan. 8, 1963

3,072,845
NOISE FACTOR MEASUREMENT SYSTEM
George Bruck, Cincinnati, Ohio, assignor to Avco Corporation, Cincinnati, Ohio, a corporation of Delaware
Filed May 9, 1960, Ser. No. 27,570
6 Claims. (Cl. 324—57)

The present invention relates generally to noise factor measuring systems and, more particularly, to systems for measuring the noise factor of a signal amplitude device by switching noise from an auxiliary source into the device for times determined by measurements of relative noise powers deriving from the device, taken with and without auxiliary noise applied to the device input.

A preferred embodiment of the invention is described as applied to a radar receiver as exemplary of a signal amplifying device. The need for reliable and continuous operation of electronic equipment implies the desirability of providing frequent and rapid checking of the noise factor of the equipment. Extant devices commonly employed for the automatic measurement of noise factor suffer from limitations which cannot be tolerated in effecting measurements of pulse amplifying devices, such as radar receivers. In particular, many available systems involve the total disablement of the device under test, during the test, which may be unacceptable. Some systems for measuring noise factor are based on erroneous theoretical concepts in that the measurements are based on noise amplitude instead of noise power.

Briefly describing a preferred embodiment of the invention, as applied to a radar receiver exemplary of a signal amplifying device, a source of auxiliary noise is provided which is alternately coupled to and decoupled from a suitable element of the receiver, such as its R.F. stage or its antenna. Coupling and decoupling is effected by a voltage-controlled multivibrator which varies as a function of control voltage with respect to time periods $t_1$ and $t_2$ for which the multivibrator remains in its alternative states. Auxiliary noise may be thus gated into the receiver for times $t_1$ and not for times $t_2$. During the period $t_1$ the receiver input contains (a) Johnson noise, (b) noise to be measured, and (c) noise inserted from the auxiliary source. During the period $t_2$ only the auxiliary noise is eliminated, leaving the inherent noise.

The principle of gating an auxiliary noise source into the input of the system is utilized in the proposed scheme. The input of the system under test is connected to the antenna by a shutter which can be either open or closed, according to whether antenna noise should be included or excluded from the measurement. The noise source is added to the input.

A multivibrator gates the noise source on during a period $t_1$ and off during a period $t_2$. Simultaneously, this multivibrator grates the output of the instrument under test during the period $t_1$ into thermistor $T_1$, and during the period $t_2$ into thermistor $T_2$. An auxiliary amplifier may be needed.

The thermistor bridge is pre-balanced. Under balanced conditions, the product of $t_1$ and the power into $T_1$ will be equal to the product of $t_2$ and the power into $T_2$. The unbalance of the bridge is used to control the ratio of $t_1$ to $t_2$ of the multivibrator. Under these conditions and with sufficient gain in the feedback circuit, the ratio of $t_1$ to $t_2$ and knowledge of the power of the noise source are sufficient to compute the noise figure of the instrument under test.

It is, accordingly, a broad object of the present invention to provide a novel system for measuring noise factor.

It is another object of the present invention to provide a system for measuring noise factor by applying auxiliary noise to a signal amplifier for measured time intervals, the auxiliary noise being removed during time intervals intermediate these time intervals, and indicating noise factor as a function of the several time intervals.

Still another object of the present invention resides in the provision of a system for applying auxiliary noise to a signal amplifying system for times and in intensities such as to equate the time integrals of normal noise and normal noise plus auxiliary noise, derivable from the amplifying device.

The above and still further objects, features, and advantages of the present invention will become apparent upon consideration of the following detailed description of one specific embodiment thereof, especially when taken in conjunction with the accompanying drawings, wherein:

The single figure is a block diagram of a system according to the invention.

Referring now more specifically to the accompanying drawing, the reference numeral 10 denotes an antenna exemplary of a signal source. Antenna 10 is connected to the input of an R.F. amplifier stage 12 via a wave guide 11, having included therein a wave guide switch 13. The output of R.F. amplifier stage 12 is applied to a mixer 14 to which is also applied the output of a suitable local oscillator 15. The output of mixer 14 is implified in an I.F. amplifier 16, and the output of the latter applied to a switching gate 17.

The antenna 10 and the R.F. amplifier 12, mixer 14, local oscillator 15, and I.F. amplifier 16 correspond with conventional elements of a radar receiver and, as such, may be generically designated an amplifying device. However, the present invention is not limited in its application to any specific amplifying device and may be applied to passive devices, such as filters or simple circuit elements.

The gate 17 normally channels its output to a thermistor $T_1$, but when subjected to control signal via lead 18 channels its output to thermistor $T_2$. Gate 17, accordingly, is a selective switching device.

Thermistors $T_1$ and $T_2$ form adjacent arms of a simple bridge circuit 19, conjugate arms being formed by resistances 20 and 21, of which resistance 21 alone is shown variable to permit prebalancing of the bridge. Connected from the junction 22 of thermistors $T_1$, $T_2$ to the junction 23 of resistances 20, 21 is a suitable standard or reference voltage source, shown as a battery 24. The junction 25 of thermistor $T_1$ and resistance 20 is grounded, and the remaining bridge junction 26 is connected to a lead 27. So long as the bridge 19 is in balance, zero signal appears on lead 27. Unbalance of the bridge 19 results in development of a control voltage on lead 27, representative of the extent and sense of bridge unbalance in terms of magnitude and polarity with respect to ground.

An auxiliary noise source 28 is provided, which is shown coupled directly to the input of R.F. amplifier 12. The noise source 28 may be cut off in response to application of a control signal via lead 29. Multivibrator 30 supplies control signal via lead 29 to noise source 28 and via lead 18 to gate 17. Control voltage supplied to multivibrator 30 via lead 27 serves to control the relative times of the alternative states of multivibrator 30, and thereby the relative durations of the control signals applied to leads 29 and 18, respectively, deriving from alternate sides of the multivibrator 30. The control signals applied to leads 29 and 18, respectively, serve to turn on noise source 28 and to couple thermistor $T_1$ to I.F. amplifier 16 for corresponding times, and thereafter to disable noise source 28 and to couple thermistor $T_2$ to I.F. amplifier 16.

Multivibrator 30 provides a further gate signal to a storage integrator 31, connecting the storage integrator 31 to a source of constant voltage 32 of predetermined magnitude. The storage integrator 31 in its simple form comprises a resistance R in series with a storage capacitor C, although more elaborate forms of storage indicator are known. The total voltage acquired by the storage indicator is a function of $$\frac{t_1}{t_1+t_2}$$

and may be visually indicated by a meter 33 if desired, which may be pre-set to provide an alarm in response to attainment of a predetermined value of the output of storage indicator 31.

It is a function of switch 13 to isolate R.F. stage 12 from antenna 10, so that noise measurements will relate to the receiver per se, without antenna. It is obvious that noise source 28 may be coupled to antenna 10 and switch 13 opened, in which case the noise figure computed by the present system will be the noise figure of antenna plus receiver.

Reviewing the operation of the system, during the period $t_1$ receiver output is gated by gate 17 into thermistor $T_1$, and during time $t_2$ into thermistor $T_2$. During time $t_1$ the receiver input contains white noise plus the noise to be measured plus auxiliary noise provided by source 28. During time $t_2$ noise source 28 is disabled, control signal deriving from multivibrator 30 and applied via lead 29 performing the requisite control function for noise source 28. The polarity of control signal supplied over lead 27 from bridge 19 is selected to provide servo action—i.e., to control the relative time periods during which the multivibrator 30 occupies its alternative states so as to tend to rebalance bridge 19.

When bridge 19 is in balance, it is implied that the time integrals of noise applied to the thermistors $T_1$ and $T_2$ are equal.

Noise factor, sometimes called noise figure, is a figure of merit specifying noise characteristics of amplifying devices, such as amplifiers, receivers, and the like. Noise figure expresses, as a power ratio, how noisy an equipment or device is in comparison with an ideal device. The common definition of noise figure is the ratio of: signal to noise power ratio at the input terminals of a device to the signal to noise ratio at the output terminals, assuming perfect impedance matching. If there is no internally generated noise in an electrical device or circuit, the noise figure will be unity. In general, $$\text{Noise figure} = \frac{\text{noise power out}}{\text{power gain} \times \text{noise power in}}$$

so that for a unity power gain circuit, noise figure is the ratio of output to input noise power. Noise figure is obviously at least unity and may have values as high as 25, for some radar receivers.

In accordance with the present system, it is the relative times $t_1$ and $t_2$ that multivibrator 30 is in its alternative states, or rather the ratio of those times, that establishes rebalance of bridge 19 and which is functionally measured by meter 33. The bridge 19 operates in balance condition, so that non-linearities of thermistor characteristics are of no consequence to accuracy of measurement so long as thermistors $T_1$ and $T_2$ are matched.

The multivibrator controls the time during which the output of a known source (such as a voltage reference) is applied through a filtering network to an indicator. This indicator reads $$E = \frac{t_1 E_o}{t_2 + t_1}$$

$E_o$ is the reference voltage. From $$R = \frac{E}{E_o}$$

the noise figure of the equipment can be computed as $$F = \frac{RF_o}{1 - 2R}$$

where $F_o$ is the ratio of the power of the noise source to thermal power. This latter value $F_o$ is fixed for a specific test equipment, and therefore the output indicator can be calibrated directly for the noise figure.

The system lends itself to a simple performance check by reversing the two thermistors. This can be done by reversing the gate functions and the polarity of the bridge. If the indicator reads the same in both positions, the thermistors are performing properly.

The verity of the calculations set forth above is easily demonstrated. When the bridge is balanced, the power in thermistor $T_1$ is equal to the power in thermistor $T_2$, or:

$$KBG(T+T_x)t_2 = KBG(T+T_x+T_N)t_1$$

where

K is a constant;
B is the bandwidth of the system;
T is the nominal temperature (290 degrees Kelvin);
$T_x$ is the equivalent noise temperature; and
$T_N$ is the temperature of the noise source NS.

Manifestly $$(T+T_x)t_2 = (T+T_x+T_N)t_1$$

But $$F_o = \frac{T_N}{T}$$

i.e., the ratio of the power of the noise source to thermal power.

$\therefore T_N = F_o T$. Accordingly, $$Tt_2 + T_x t_2 = Tt_1 + T_x t_1 + F_o Tt_1$$

$$F_o = \frac{Tt_2 + T_x t_2 - Tt_1 - T_x t_1}{Tt_1}$$

$$F = 1 + \frac{T_x}{T} = \frac{T+T_x}{T}$$

$$\frac{F}{F_o} = \frac{T+T_x}{T} \times \frac{Tt_1}{Tt_2 + T_x t_2 - Tt_1 - T_x t_1}$$

$$= \frac{(T+T_x) \times t_1}{t_2(T+T_x) - t_1(T+T_x)} = \frac{t_1}{t_2 - t_1}$$

Further, $$R = \frac{E}{E_o} = \frac{t_1}{t_2 + t_1}$$

$$F = \frac{\frac{t_1}{t_2+t_1} \times F_o}{1 - \frac{2t_1}{t_2+t_1}} = \frac{t_1 F_o}{t_2 + t_1 - 2t_1} = \frac{t_1 F_o}{t_2 - t_1}$$

$$\frac{F}{F_o} = \frac{t_1}{t_2 - t_1}$$

While I have described and illustrated one specific embodiment of my invention, it will be clear that variations of the details of construction which are specifically illustrated and described may be resorted to without departing from the true spirit and scope of the invention as defined in the appended claims.

I claim:

1. A system for measuring the noise figure of electrical circuitry, said electrical circuitry including an input circuit and an output circuit, a source of auxiliary noise signal, means for applying said auxiliary noise signal to said input circuit only for time intervals of durations $t_1$ separated by time intervals of durations $t_2$, a bridge circuit including a first arm and a second arm, said first and second arms each including an electrical integrated power-responsive resistance, means for coupling said first arm to said output circuit only during said times $t_1$, means for coupling said second arm to said output circuit only during said times $t_2$, said bridge circuit being balanced when said electrical integrated power-responsive resistances are equal and generating an unbalance voltage when said power-responsive resistances are unequal, and adjustable means responsive to said unbalance voltage for varying the relative magnitudes of $t_1$ and $t_2$ to rebalance said bridge circuit.

2. A system for measuring the noise figure of electrical circuitry, said electrical circuitry including an input circuit, an output circuit, a source of auxiliary noise signal, comparator means coupled to said output circuit for balancing integrals of noise power in said output, means for selectively effectively connecting said auxiliary noise source to said input circuit and effectively disconnecting said auxiliary noise source from said input circuit for relatively controllable successive time intervals, the comparator developing one integral of noise power in said output when the auxiliary noise source is connected to said input circuit and another integral of noise power in said output when said auxiliary source is not connected to said input circuit, and means coupled to the comparator means and responsive to a differential between said integrals for controlling said successive time intervals so as to equalize the time integrals of noise power in said output circuits during said successive time intervals.

3. A system for measuring noise figure of an electrical circuit, said electrical circuit including an input circuit and an output circuit, a source of auxiliary noise signals, a voltage sensitive multivibrator having alternative states, means responsive to said multivibrator in only one of said states for applying said auxiliary noise signals to said input circuit, and comparator means coupled to said output circuit and responsive to noise signals in said output circuit for generating a control voltage representative of difference of integrated noise powers in said output circuit during alternative states of said multivibrator, said comparator being coupled to said multivibrator and applying said control voltage to said multivibrator in such sense as to tend to equalize said integrated noise powers.

4. A system for measuring noise figure of an electrical system having an input circuit and an output circuit comprising a source of auxiliary noise signal, switch means having alternative states, means responsive to said switch means in only one of said states for applying auxiliary noise deriving from said noise source to said input circuit, means for measuring relative values of integrated noise powers in said output circuit during alternative states of said switch, and means coupled to the last-named means for controlling the relative time intervals during which said switch is in said alternative states so as to equalize said integrated noise powers.

5. A device for the direct reading of the noise factor of a signal translating system having an input and an output, comprising: an artificial noise source of known noise characteristics, a thermistor bridge having first and second arms, means for coupling said noise source to said input during successive spaced periods $t_1$ and for uncoupling said noise source from said input during alternate spaced periods $t_2$, means for gating the output of said signal translating system to a first arm of said bridge during periods $t_1$ and to a second arm of said bridge during periods $t_2$, timing means for controlling the coupling and gating means to determine the durations of the periods $t_1$ and $t_2$, means for deriving an unbalanced voltage from said bridge to control the speed of the timing means in such a way as to balance said bridge, a standard voltage source producing a reference voltage $E_o$, and means coupled to said timing means and to said standard voltage source for measuring the quantity E, which is equal to $$\frac{t_1 E_o}{t_2 + t_1}$$

the last mentioned means being calibrated in terms of noise factor, whereby the latter is directly read.

6. A system for measuring the noise figure of electrical circuitry, said electrical circuitry including an input circuit and an output circuit, comprising: A source of auxiliary noise; means for applying said auxiliary noise to said input circuit for repetitive time intervals $t_1$ separated by time intervals $t_2$; means including variable pulse generating means for controlling the values of $t_1$ and $t_2$ so as to generate equal time integrals of noise over said time intervals $t_1$ and $t_2$ at said output circuit; said means for controlling the value of $t_1$ and $t_2$ including a bridge circuit, said bridge circuit including a first thermistor in one arm of said bridge circuit, a second thermistor in another arm of said bridge circuit, and means coupling said output circuit in alternation to said one arm and said another arm during said times $t_1$ and $t_2$, respectively; said pulse generating means being coupled to said bridge and responsive to unbalance of the bridge to restore its balance.

References Cited in the file of this patent
UNITED STATES PATENTS

| | | |
|---|---|---|
| 2,691,098 | Selove | Oct. 5, 1954 |
| 2,891,217 | Grieg et al. | June 16, 1959 |
| 2,959,672 | Haise | Nov. 8, 1960 |